United States Patent
Mao

(10) Patent No.: US 10,156,062 B2
(45) Date of Patent: Dec. 18, 2018

(54) PLASTIC WATER CHANNEL MAIN BODY OF TEMPERATURE ADJUSTABLE WATER TAP

(71) Applicant: Harda (Xiamen) Plastic Co., Ltd., Xiamen (CN)

(72) Inventor: Lianhua Mao, Xiamen (CN)

(73) Assignee: HARDA (XIAMEN) PLASTIC CO., LTD., Xiamen, Fujian (CN)

( * ) Notice: Subject to any disclaimer, the term of this patent is extended or adjusted under 35 U.S.C. 154(b) by 105 days.

(21) Appl. No.: 14/759,936

(22) PCT Filed: Jan. 17, 2014

(86) PCT No.: PCT/CN2014/070772
§ 371 (c)(1),
(2) Date: Jul. 9, 2015

(87) PCT Pub. No.: WO2015/054980
PCT Pub. Date: Apr. 23, 2015

(65) Prior Publication Data
US 2015/0354183 A1 Dec. 10, 2015

(30) Foreign Application Priority Data

Oct. 15, 2013 (CN) .......................... 2013 1 0481740
Oct. 15, 2013 (CN) ..................... 2013 2 0640555 U

(51) Int. Cl.
*E03C 1/086* (2006.01)
*E03C 1/04* (2006.01)
*F16K 11/00* (2006.01)

(52) U.S. Cl.
CPC .......... *E03C 1/0403* (2013.01); *F16K 19/006* (2013.01); *Y10T 137/0491* (2015.04); *Y10T 137/87579* (2015.04)

(58) Field of Classification Search
CPC ........ E03C 1/04; F16K 11/207; F16K 19/006; Y10T 137/9464
(Continued)

(56) References Cited

U.S. PATENT DOCUMENTS 3,448,768 A * 6/1969 Keller ................... F16K 19/006
118/621
3,490,492 A * 1/1970 Fairchild ................... E03C 1/04
137/625.4

(Continued)

*Primary Examiner* — Reinaldo Sanchez-Medina
(74) *Attorney, Agent, or Firm* — Leong C. Lei

(57) ABSTRACT

A plastic water channel main body of a temperature adjustable water tap includes a plastic H-shaped frame and a water sealing plate. A water outlet leading upward is disposed in the middle of a transverse pipe of the frame. Two ends of the transverse pipe are connected to valve seats protruding upward. An inner hole of the transverse pipe enables the water outlet to communicate with inner cavities of the two valve seats. The bottom of each valve seat is provided with a water inlet and a water inlet pipe extending downward. Each water inlet pipe communicates with the water inlet of the corresponding valve seat. The front of the transverse pipe is provided with a channel communicating with the inner hole and cutting into the inner cavities of the two valve seats. The water sealing plate is fixed on the opening of the channel and seals the channel.

18 Claims, 8 Drawing Sheets

(58) Field of Classification Search
USPC .............. 137/603, 606, 625.4, 625.41, 801
See application file for complete search history.

(56) References Cited

U.S. PATENT DOCUMENTS

| | | | | | |
|---|---|---|---|---|---|
| 3,770,004 | A | * | 11/1973 | Johnson | F16K 27/0263 137/315.12 |
| 4,513,769 | A | * | 4/1985 | Purcell | B23P 11/00 137/15.18 |
| 4,649,958 | A | * | 3/1987 | Purcell | B23P 11/00 137/615 |
| 5,797,151 | A | * | 8/1998 | Ko | E03C 1/04 137/801 |
| 7,055,545 | B2 | * | 6/2006 | Mascari | E03C 1/0401 137/359 |
| 7,231,936 | B2 | * | 6/2007 | Chang | E03C 1/0403 137/328 |
| 8,746,273 | B2 | * | 6/2014 | Yang | E03C 1/0401 137/315.12 |
| 2004/0154673 | A1 | * | 8/2004 | Mascari | E03C 1/0401 137/801 |
| 2010/0096034 | A1 | * | 4/2010 | Hou | B29C 45/16 137/801 |
| 2011/0259456 | A1 | * | 10/2011 | Pinette | F16K 11/20 137/603 |
| 2013/0181440 | A1 | * | 7/2013 | Dai | F16K 19/006 285/124.2 |

\* cited by examiner

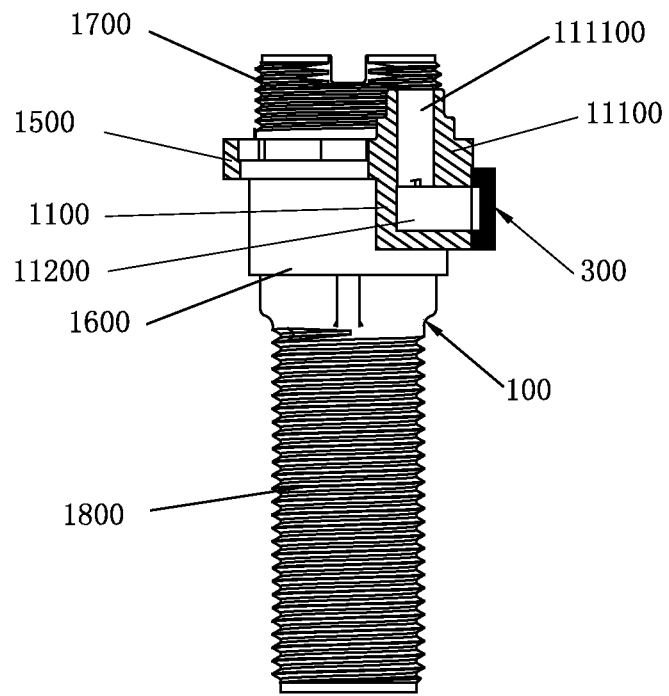
F I G. 15

PLASTIC WATER CHANNEL MAIN BODY OF TEMPERATURE ADJUSTABLE WATER TAP

BACKGROUND OF THE INVENTION

1. Field of the Invention

The present invention relates to a bathroom accessory, and more particularly, to a plastic water channel main body of a dual-inlet temperature adjustable water tap.

2. Description of the Prior Art

A dual-inlet temperature adjustable water tap is equipped with an H-shaped water channel main body. A water outlet leading upward is disposed in the middle segment of a transverse pipe of the frame. Two ends of the transverse pipe are respectively connected to valve seats protruding upward for installing water adjustment vales conveniently. An inner hole of the transverse pipe enables the water outlet to communicate with inner cavities of the two valve seats at the two ends of the transverse pipe. The bottom of each valve seat is provided with a water inlet and a water inlet pipe extending downward. The outer periphery of the water inlet pipe is provided with outer threads for the water channel main body to be connected with the panel of the bathroom accessory.

The water channel main body of a conventional dual-inlet temperature adjustable water tape is made of copper by molding to form a semi-finished product, and then the semi-finished product is processed with complicated machining. Due to the scarcity of copper, high cost of machining, and low yield, the copper water channel main body is expensive. For this reason, people are trying to develop a plastic water channel main body instead of the copper water channel main body by means of injection molding technique which is suitable for mass production instead of the complicated machining. Because the structure of the plastic water channel main body of the temperature adjustable water tap is special and complicated, it is unable to form the inner hole of a transverse hole of the water channel main body. Therefore, it cannot produce an integrated plastic water channel main body. The plastic water channel main body must be manufactured step by step. This lowers the production efficiency and increases cost. On the other hand, it is difficult to guarantee the overall structural strength of the product and its durability, and the appearance of the product will be affected.

Accordingly, the present invention intends to provide a dual faucet structure for improving the shortcomings mentioned above.

SUMMARY OF THE INVENTION

The primary object of the present invention is to provide a plastic water channel main body of a temperature adjustable water tap and a manufacture method thereof, having good integrity and not using copper material.

According to one aspect of the present invention, the plastic water channel main body of the temperature adjustable water tape has an H shape and comprises a plastic H-shaped frame and a water sealing plate. The frame includes a transverse pipe and two tubular valve seats extending upward. The middle segment of the transverse pipe is provided with a water outlet extending upward. The right and right ends of the transverse pipe are connected with the two valve seats. The transverse pipe has an inner hole therein, enabling the water outlet to communicate with inner cavities of the two valve seats at the two ends of the transverse pipe. External threads are arranged on the outer wall of an upper portion of each valve seat. The bottom of each valve seat is provided with a water inlet and a water inlet pipe extending downward. The outer wall of the water inlet pipe is provided with outer threads. The water inlet pipe communicates with the water inlet of a corresponding one of the two valve seats of the frame. The front side of the transverse pipe is provided with a channel communicating with the inner hole and cutting into the inner cavities of the two valve seats. The water sealing plate is secured at an end opening of the channel so as to seal the channel The plastic water channel main body of the temperature adjustable water tape of the present invention is based on the water channel main body of a normal temperature adjustable water tape. The front side of the transverse pipe is provided with the channel communicating with the inner hole and cutting into the inner cavities of the two valve seats. In this way, the injection technique of an existing two-way core-pulling is added with a three-way core-pulling to form the channel, such that the plastic frame is manufactured. After that, the water sealing plate is secured at an end opening of the channel so as to seal the channel The present invention has good integrity and does not using copper material.

In a preferred embodiment, a sealing ring is provided between the water sealing plate and the end opening of the channel of the transverse pipe. The sealing ring is configured to prevent leakage between the transverse pipe of the frame and the water sealing plate, enhancing the quality of the products.

In a preferred embodiment, the water sealing plate is welded to the end opening of the channel of the transverse pipe by high frequency welding or hot plate welding to prevent leakage between the transverse pipe of the frame and the water sealing plate. On one hand this improves the quality of the products, on the other hand this simplifies the structure of the water sealing plate and the end opening of the channel of the transverse pipe of the frame because it does not use the sealing ring so as to simplify the molds of the frame and the water sealing plate and to lower the manufacture cost.

In a preferred embodiment, the plastic water channel main body of the temperature adjustable water tap further comprises a plastic tubular two-step forming sleeve. The two-step forming sleeve is configured to wrap the transverse pipe of the frame and the water sealing plate. The two-step forming sleeve has a recess for the water outlet of the transverse pipe of the frame to extend out.

Preferably, a core is formed by two-step injection molding after the plastic H-shaped frame and the water sealing plate are connected and installed. The core is placed on another injection machine The transverse pipe of the core and the outer periphery of the water sealing plate are wrapped with the plastic tubular two-step forming sleeve by two-step injection molding. The two-step forming sleeve has a recess for the water outlet of the transverse pipe of the frame to extend out so as to form an integral plastic water channel main body. The two-step forming sleeve is configured to cover the seams between the transverse pipe and the water sealing plate, enabling the appearance to be neat and beautiful.

Preferably, the top surface of the transverse pipe is provided with an installation disc surrounding the water outlet and extending rearward. The recess of the two-step forming sleeve is adapted to mate with the installation disc. The installation disc and the two-step forming sleeve are connected edge by edge, such that the water outlet nozzle installed on the installation disc and the two-step forming sleeve become one-piece. When in use, the entire appearance is neat and beautiful.

By means of changing the structure and manufacture method, the plastic water channel main body of the temperature adjustable water tape of the present invention solves the problem that the normal injection technique is unable to form the inner hole of the transverse pipe of the water channel main body for an integral plastic water channel main body. The plastic water channel main body of the present invention has good installation strength and is durable. The plastic water channel main body of the temperature adjustable water tape of the present invention totally uses plastic materials, so the material cost is low. In addition, the plastic water channel main body of the temperature adjustable water tape is manufacture by injection molding, without the need of mechanical processing. The present invention has high efficiency, can be mass produced, and the processing cost is low. Therefore, the total cost of the plastic water channel main body of the temperature adjustable water tape of the present invention is low, instead of a copper water adjustment frame. Due to a lower price, it is more acceptable to the consumers and has broad market prospects.

BRIEF DESCRIPTION OF THE DRAWINGS

FIG. 15 is a sectional view taken along line F-F of FIG. 14.

DETAILED DESCRIPTION OF THE PREFERRED EMBODIMENTS

Embodiments of the present invention will now be described, by way of example only, with reference to the accompanying drawings.

Figure 1:
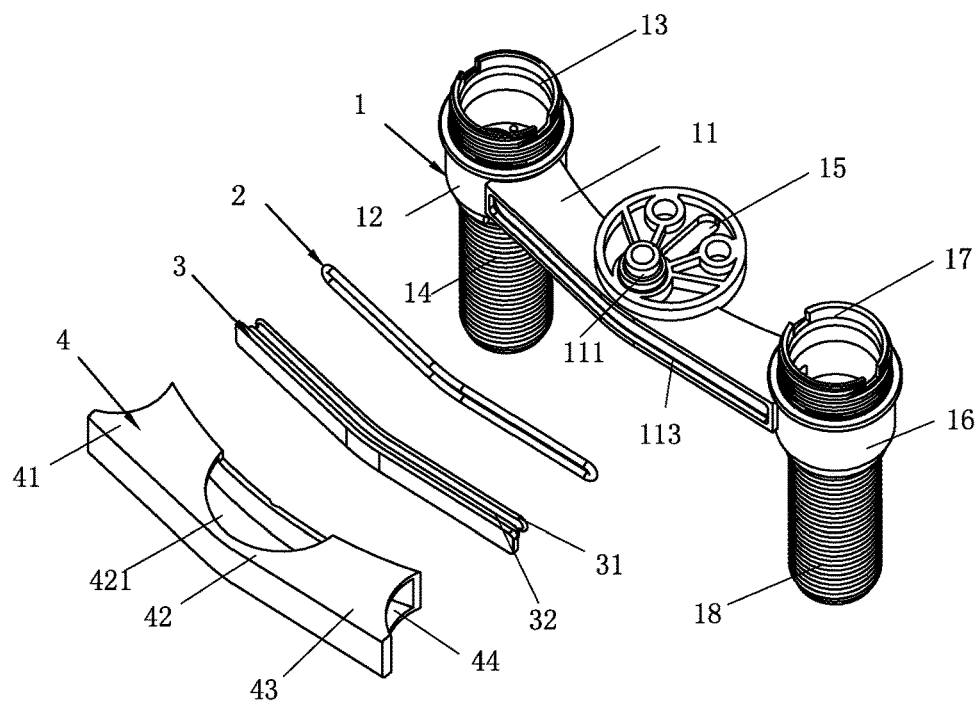
FIG. 1 is an exploded view of a plastic water channel main body of a temperature adjustable water tap according to a first embodiment of the present invention
Figure 2:
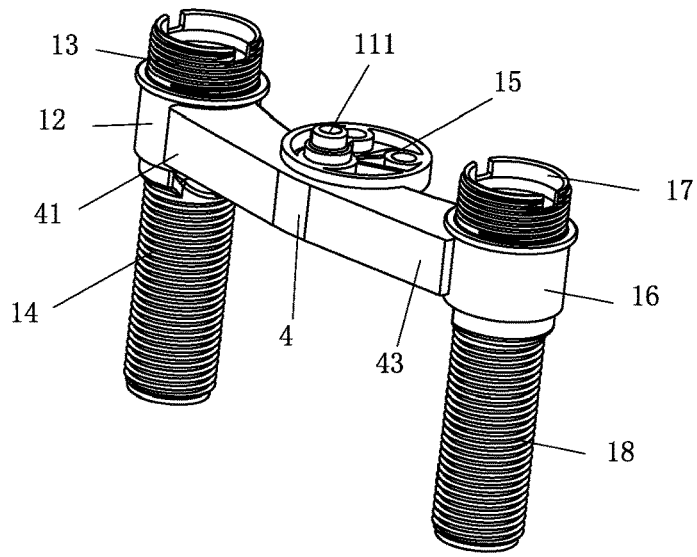
FIG. 2 is a perspective view of the embodiment in FIG. 1.

FIG. 1 is an exploded view of a plastic water channel main body of a temperature adjustable water tap according to a first embodiment of the present invention. The plastic water channel main body of the temperature adjustable water tap comprises a plastic H-shaped frame 1, a rubber sealing ring 2, a water sealing plate 3, and a plastic tubular two-step forming sleeve 4.

Figure 3:
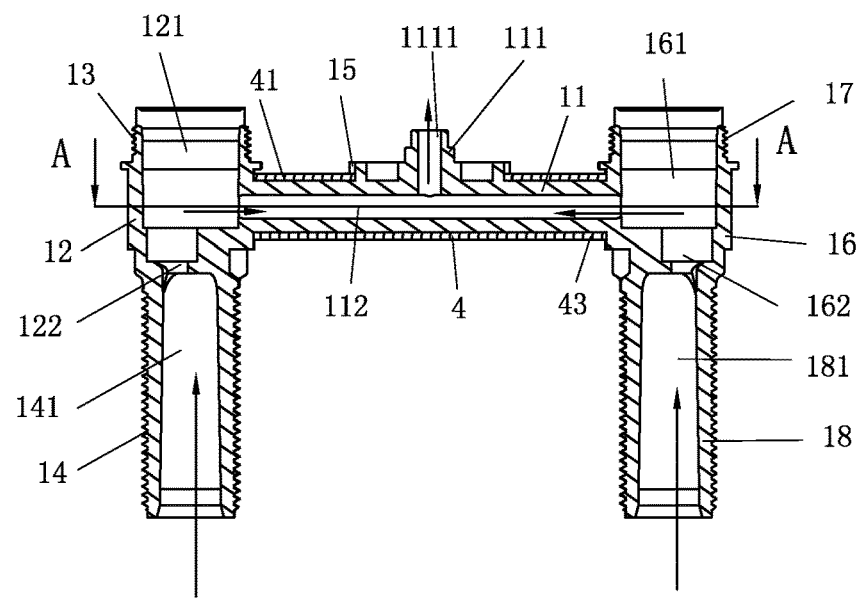
FIG. 3 is a longitudinal sectional view of the embodiment in FIG. 1.
Figure 4:
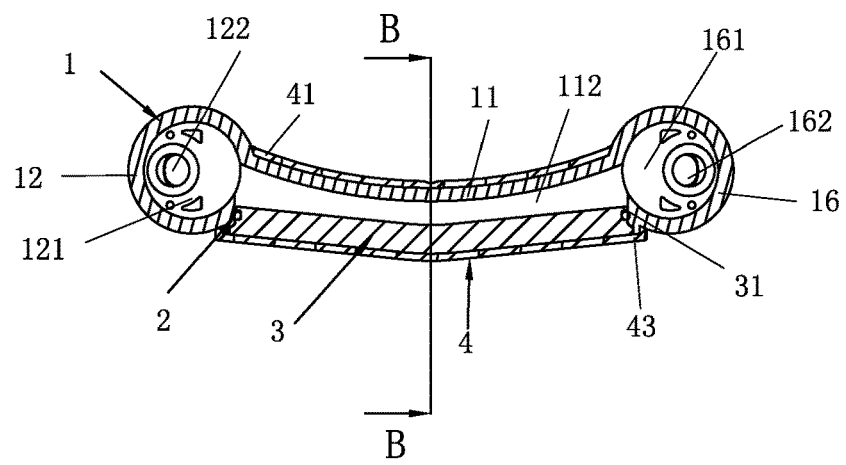
FIG. 4 is a sectional view taken along line A-A of FIG. 3.

The frame 1 includes a transverse pipe 11. The middle segment of the transverse pipe 11 is provided with a water outlet 111 extending upward. The left end of the transverse pipe 11 is connected with a tubular left valve seat 12 extending upward. The right end of the transverse pipe 11 is connected with a tubular right valve seat 16 extending upward. Referring to FIG. 3 and FIG. 4, the transverse pipe 11 has an inner hole 112 therein, enabling the water outlet 111 to communicate with inner cavities 121, 161 of the two valve seats 12, 16 at the two ends of the transverse pipe 11. The front side of the transverse pipe 11 is provided with a channel 113 communicating with the inner hole 112 and cutting into the inner cavities 121, 161 of the two valve seats 12, 16. The top surface of the transverse pipe 11 is provided with an installation disc 15 surrounding the water outlet 111 and extending rearward. External threads 13 are arranged on the outer wall of an upper portion of the left valve seat 12. The bottom of the left valve seat 12 is provided with a left water inlet 122 and a left water inlet pipe 14 extending downward. The outer wall of the left water inlet pipe 14 is provided with outer threads. The left water inlet pipe 14 communicates with the left water inlet 122 of the left valve seat 12. External threads 17 are arranged on the outer wall of an upper portion of the right valve seat 16. The bottom of the right valve seat 16 is provided with a right water inlet 162 and a right water inlet pipe 18 extending downward. The outer wall of the right water inlet pipe 18 is provided with outer threads. The right water inlet pipe 18 communicates with the right water inlet 162 of the right valve seat 16.

Figure 5:
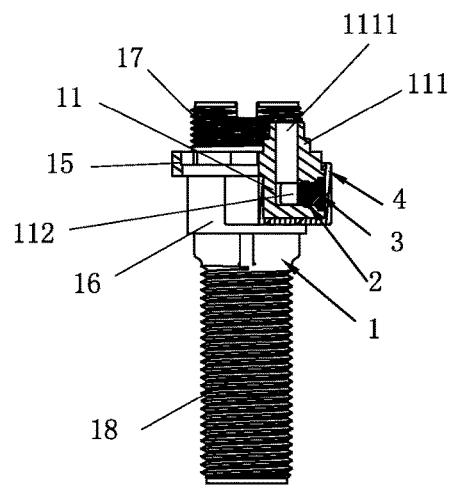
FIG. 5 is a sectional view taken along line B-B of FIG. 4.

The water sealing plate 3 corresponds in shape and size to the front side of the transverse pipe 11 of the frame 1. The rear of the water sealing plate 3 has a protruding platform 31. The protruding platform 31 corresponds in shape and size to the end opening of the channel 113 of the transverse pipe 11 of the frame 1. The bottom of the protruding platform 31 of the water sealing plate 3 is formed with an annular groove 32. The sealing ring 2 is installed in the annular groove 32. Referring to FIG. 5, the water sealing plate 3 is to cover the end opening of the channel 113. The protruding platform 31 extends into the channel 113. The sealing ring 2 seals the channel 113.

The method to manufacture the plastic water channel main body of the temperature adjustable water tap of the present invention includes the steps of: forming a plastic H-shaped frame 1 by one-step molding, wherein based on the prior technology, the injection technique of a two-way core-pulling is added with a three-way core-pulling to form the channel, such that the plastic frame is manufactured;

forming a plastic water sealing 3 by one-step molding, wherein the water sealing plate 3 is secured at the end opening of the channel 113 of the transverse pipe 11 of the H-shaped frame 1 and seals the channel 113; and forming a core by two-step injection molding after the frame 1 and the water sealing plate 3 are connected and installed, wherein the core is placed on another injection machine, the transverse pipe of the core and the outer periphery of the water sealing plate are wrapped with a plastic tubular two-step forming sleeve 4 by two-step injection molding.

The two-step forming sleeve 4 has a tubular shape. A left end 41 of the two-step forming sleeve 4 has an arc section protruding right. A right end 43 of the two-step forming sleeve 4 has an arc section protruding left. The top of a middle portion 42 of the two-step forming sleeve 4 is formed with a recess 421. The recess 421 communicates with an inner hole 44 of the two-step forming sleeve 4.

The two-step forming sleeve 4 is configured to wrap the transverse pipe 11 of the frame 1 and the water sealing plate 3 in the inner hole 44. The recess 421 of the two-step forming sleeve 4 mates with the installation disc 15, so that the water outlet 111 of the transverse pipe 11 of the frame 1 extends out of the installation disc 15, referring to FIG. 2, FIG. 3, FIG. 4, and FIG. 5. The arc section of the left end 41 of the two-step forming sleeve 4 holds against the outer periphery of the left valve seat 12, and the arc section of the right end 42 of the two-step forming sleeve 4 holds against the outer periphery of the right valve seat 16, enabling the entire water channel main body becomes an H-shaped main body.

Figure 6:
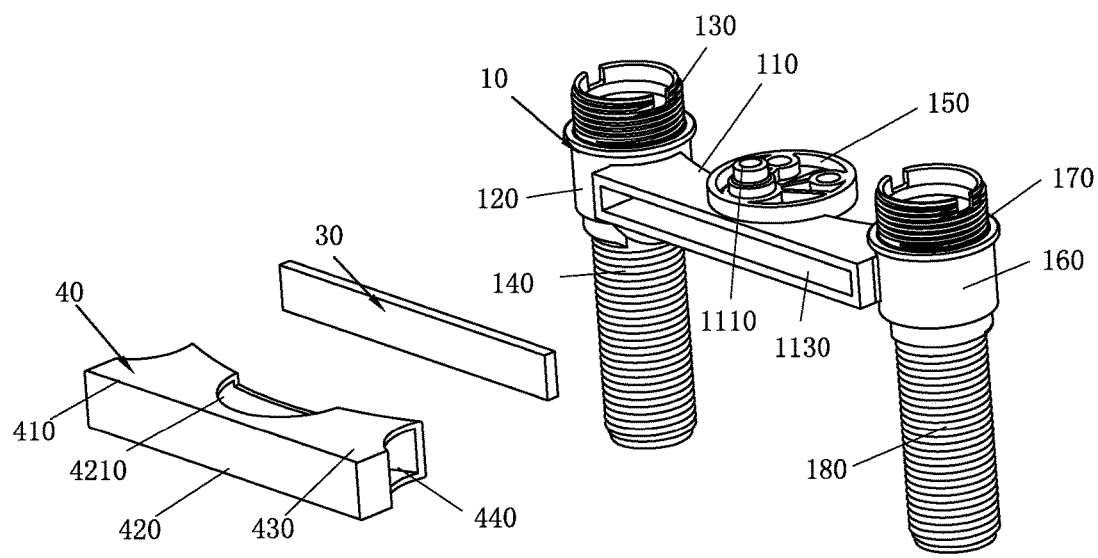
FIG. 6 is an exploded view of a plastic water channel main body of a temperature adjustable water tap according to a second embodiment of the present invention
Figure 7:
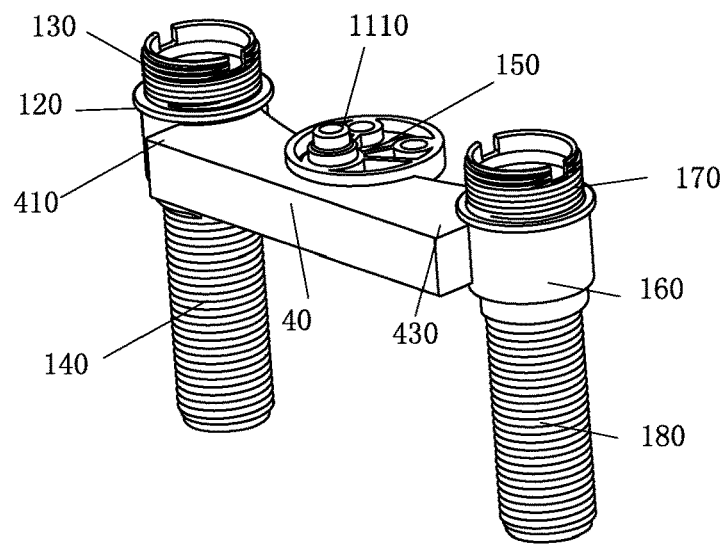
FIG. 7 is a perspective view of the embodiment in FIG. 6.

FIG. 6 is an exploded view of a plastic water channel main body of a temperature adjustable water tap according to a second embodiment of the present invention. The plastic water channel main body of the temperature adjustable water tap comprises a plastic H-shaped frame 10, a water sealing plate 30, and a plastic tubular two-step forming sleeve 40.

Figure 8:
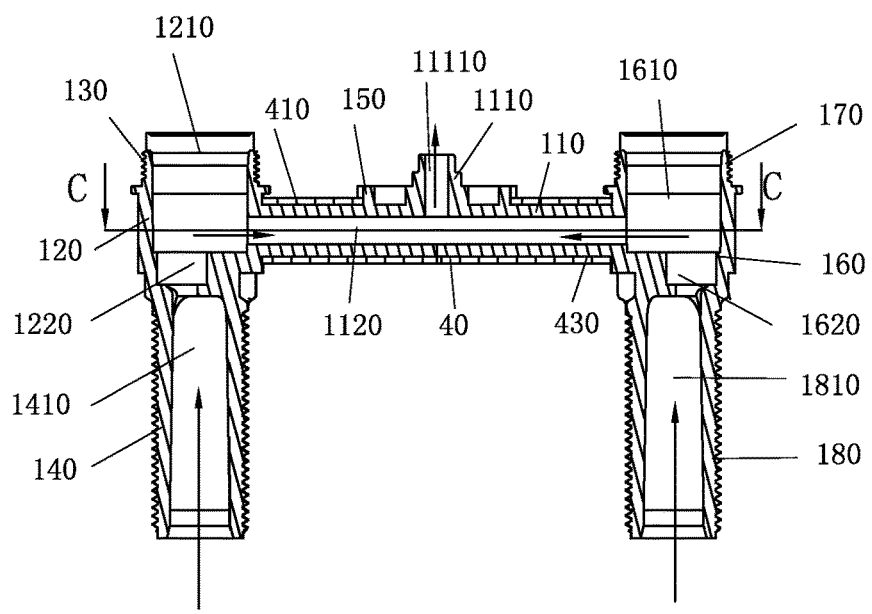
FIG. 8 is a longitudinal sectional view of the embodiment in FIG. 6.
Figure 9:
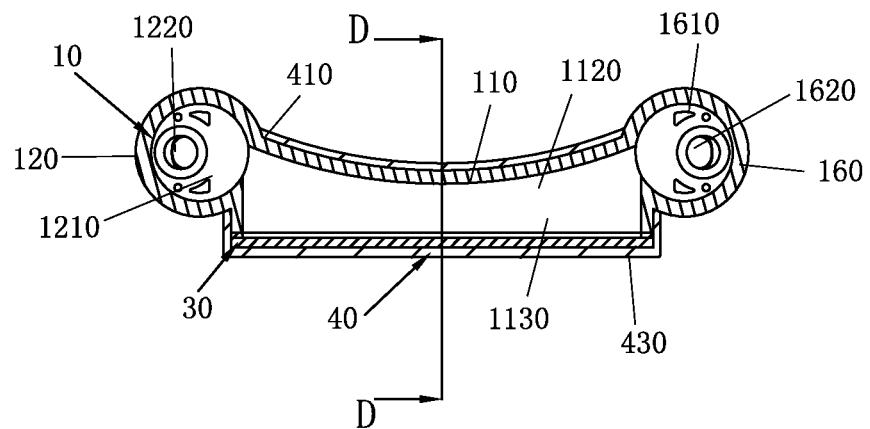
FIG. 9 is a sectional view taken along line C-C of FIG. 8.

The frame 10 includes a transverse pipe 110 at a middle position thereof. The middle segment of the transverse pipe 110 is provided with a water outlet 1110 extending upward. The left end of the transverse pipe 110 is connected with a tubular left valve seat 120 extending upward. The right end of the transverse pipe 110 is connected with a tubular right valve seat 160 extending upward. Referring to FIG. 8 and FIG. 9, the transverse pipe 110 has an inner hole 1120 therein, enabling the water outlet 1110 to communicate with inner cavities 1210, 1610 of the two valve seats 120, 160 at the two ends of the transverse pipe 110. The front side of the transverse pipe 110 is provided with a channel 1130 communicating with the inner hole 1120 and cutting into the inner cavities 1210, 1610 of the two valve seats 120, 160. The top surface of the transverse pipe 110 is provided with an installation disc 150 surrounding the water outlet 1110 and extending rearward. External threads 130 are arranged on the outer wall of an upper portion of the left valve seat 120. The bottom of the left valve seat 120 is provided with a left water inlet 1220 and a left water inlet pipe 140 extending downward. The outer wall of the left water inlet pipe 140 is provided with outer threads. The left water inlet pipe 140 communicates with the left water inlet 1220 of the left valve seat 120. External threads 170 are arranged on the outer wall of an upper portion of the right valve seat 160. The bottom of the right valve seat 160 is provided with a right water inlet 1620 and a right water inlet pipe 180 extending downward. The outer wall of the right water inlet pipe 180 is provided with outer threads. The right water inlet pipe 180 communicates with the right water inlet 1620 of the right valve seat 160.

Figure 10:
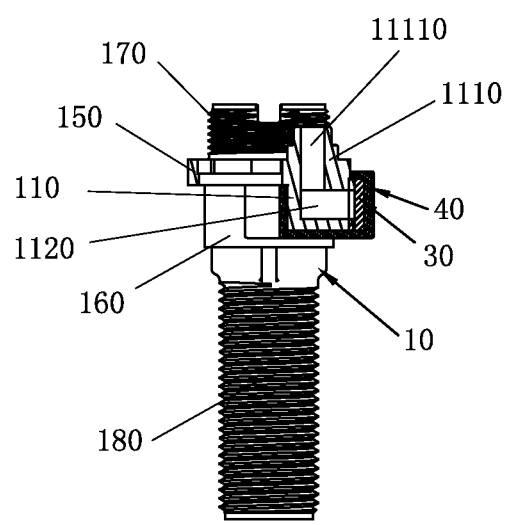
FIG. 10 is a sectional view taken along line D-D of FIG. 9.

The water sealing plate 30 corresponds in shape and size to the front side of the transverse pipe 110 of the frame 10. Referring to FIG. 10, the water sealing plate 30 is to cover the end opening of the channel 1130, and the water sealing plate 30 and the end opening of the channel 1130 are welded by high frequency welding or hot plate welding, enabling the water sealing plate 30 to seal the channel 1130.

The two-step forming sleeve 40 has a tubular shape. A left end 410 of the two-step forming sleeve 40 has an arc section protruding right. A right end 430 of the two-step forming sleeve 40 has an arc section protruding left. The top of a middle portion 420 of the two-step forming sleeve 40 is formed with a semicircular recess 4210. The recess 4210 communicates with an inner hole 440 of the two-step forming sleeve 40.

The two-step forming sleeve 40 is configured to wrap the transverse pipe 110 of the frame 10 and the water sealing plate 30 in the inner hole 440. The recess 4210 of the two-step forming sleeve 40 mates with the installation disc 150, so that the water outlet 1110 of the transverse pipe 110 of the frame 10 extends out of the installation disc 150, referring to FIG. 7, FIG. 8, FIG. 9, and FIG. 10. The arc section of the left end 410 of the two-step forming sleeve 40 holds against the outer periphery of the left valve seat 120, and the arc section of the right end 420 of the two-step forming sleeve 40 holds against the outer periphery of the right valve seat 160, enabling the entire water channel main body becomes an H-shaped main body.

Figure 11:
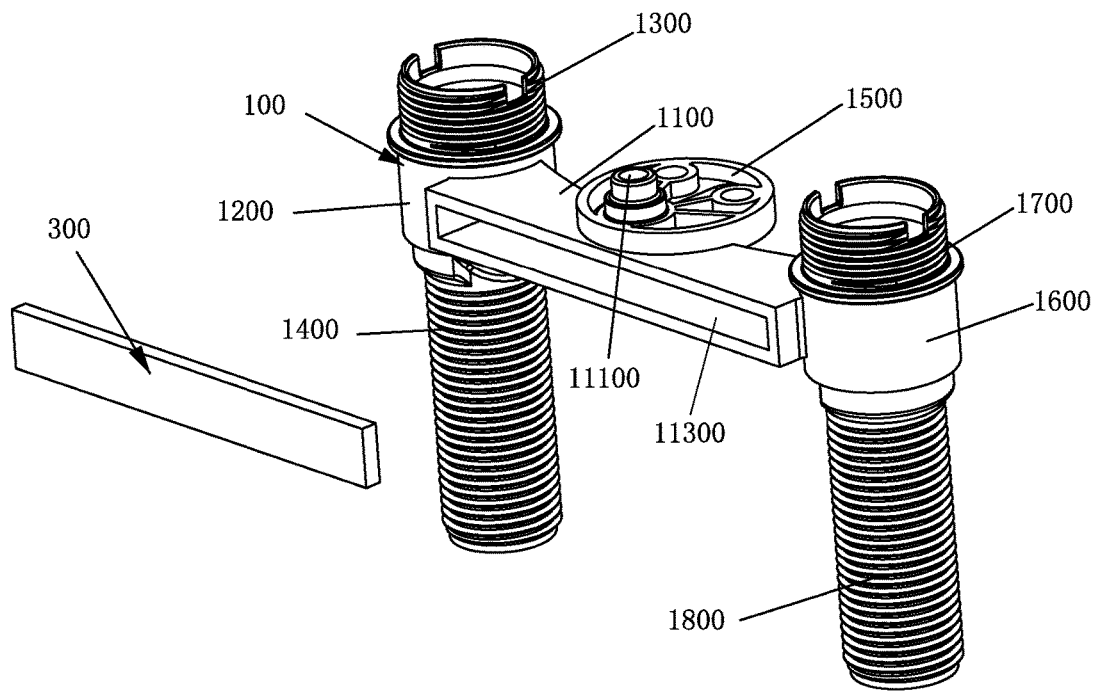
FIG. 11 is an exploded view of a plastic water channel main body of a temperature adjustable water tap according to a third embodiment of the present invention
Figure 12:
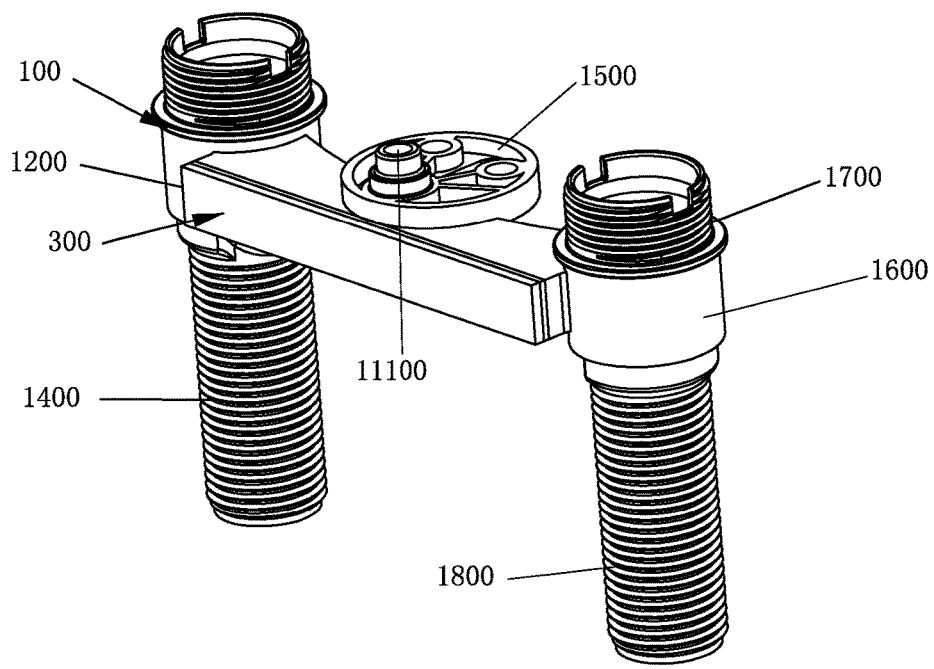
FIG. 12 is a perspective view of the embodiment in FIG. 11.

FIG. 11 is an exploded view of a plastic water channel main body of a temperature adjustable water tap according to a third embodiment of the present invention. The plastic water channel main body of the temperature adjustable water tap comprises a plastic H-shaped frame 100 and a water sealing plate 300.

Figure 13:
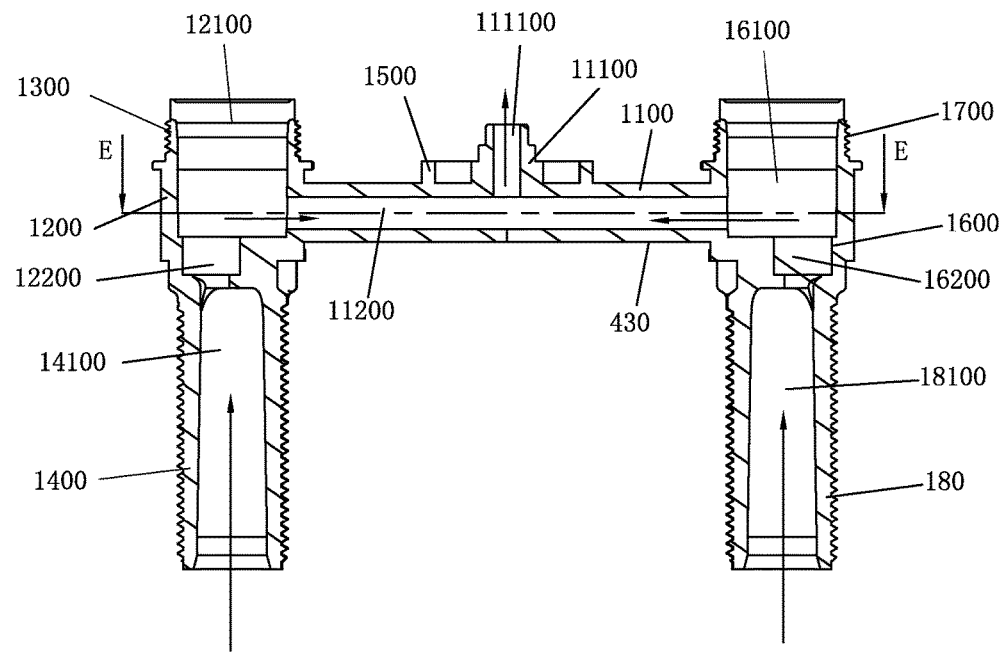
FIG. 13 is a longitudinal sectional view of the embodiment in FIG. 11.
Figure 14:
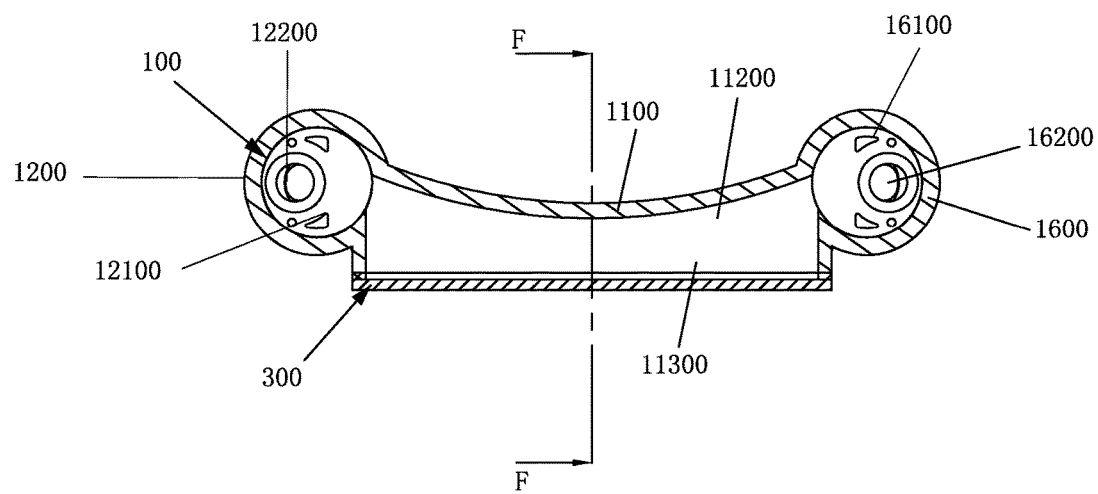
FIG. 14 is a sectional view taken along line E-E of FIG. 13.

The frame 100 includes a transverse pipe 1100 at a middle position thereof. The middle segment of the transverse pipe 1100 is provided with a water outlet 11100 extending upward. The left end of the transverse pipe 1100 is connected with a tubular left valve seat 1200 extending upward. The right end of the transverse pipe 1100 is connected with a tubular right valve seat 1600 extending upward. Referring to FIG. 13 and FIG. 14, the transverse pipe 1100 has an inner hole 11200 therein, enabling the water outlet 11100 to communicate with inner cavities 12100, 16100 of the two valve seats 1200, 1600 at the two ends of the transverse pipe 1100. The front side of the transverse pipe 1100 is provided with a channel 11300 communicating with the inner hole 11200 and cutting into the inner cavities 12100, 16100 of the two valve seats 1200, 1600. The top surface of the transverse pipe 1100 is provided with an installation disc 1500 surrounding the water outlet 11100 and extending rearward. External threads 1300 are arranged on the outer wall of an upper portion of the left valve seat 1200. The bottom of the left valve seat 1200 is provided with a left water inlet 12200 and a left water inlet pipe 1400 extending downward. The outer wall of the left water inlet pipe 1400 is provided with outer threads. The left water inlet pipe 1400 communicates with the left water inlet 12200 of the left valve seat 1200. External threads 1700 are arranged on the outer wall of an upper portion of the right valve seat 1600. The bottom of the right valve seat 1600 is provided with a right water inlet 16200 and a right water inlet pipe 1800 extending downward. The outer wall of the right water inlet pipe 1800 is provided with outer threads. The right water inlet pipe 1800 communicates with the right water inlet 16200 of the right valve seat 1600.

The water sealing plate 300 corresponds in shape and size to the front side of the transverse pipe 1100 of the frame 100. Referring to FIG. 15, the water sealing plate 300 is to cover the end opening of the channel 11300, and the water sealing plate 300 and the end opening of the channel 11300 are welded by high frequency welding or hot plate welding, enabling the water sealing plate 300 to seal the channel 11300, enabling the entire water channel main body becomes an H-shaped main body.

The plastic water channel main body of the temperature adjustable water tap of the present invention has good integrity and does not use copper material. The present invention can be widely applied to sanitary products and has good industrial applicability.

Although particular embodiments of the present invention have been described in detail for purposes of illustration, various modifications and enhancements may be made without departing from the spirit and scope of the present invention. Accordingly, the present invention is not to be limited except as by the appended claims.

I claim:

1. A plastic body for a water channel comprising:
   a first valve;
   a second valve;
   a transverse frame between the first and second valves, wherein an opening is at a first side of the transverse frame;
   a plate covering the opening, wherein the transvers frame and plate form a linking pipe between the first and second valves; and
   a sleeve surrounding the linking pipe, wherein the sleeve contacts the transverse frame and plate and covers an interface between the transverse frame and plate.

2. The plastic body of further comprising a ring at a periphery of the plate and between the periphery of the plate and the transverse frame.

3. The plastic body of claim 1, wherein the plate is welded to the opening.

4. The plastic body of claim 1, wherein the transverse frame has a water outlet at a second side thereof communicating with the first and second valves through the linking pipe.

5. The plastic body of claim 4, wherein the second side is at a top side of the transverse frame and the first side is at a front side of the transverse frame.

6. The plastic body of claim 1 further comprising a first inlet pipe connecting to the linking pipe via the first valve and a second inlet pipe connecting to the linking pipe via the second valve.

7. The plastic body of claim 6, wherein the first inlet pipe extends in parallel to the second inlet pipe.

8. The plastic body of claim 1, wherein the opening receives the plate.

9. The plastic body of claim 1, wherein the transverse frame is fixed to a planar surface of the plate.

10. The plastic body of claim 1 further comprising a first inlet pipe connecting to the linking pipe via the first valve and a second inlet pipe connecting to the linking pipe via the second valve, wherein a flow direction in the first inlet pipe is the same as that in the second inlet pipe, wherein the transverse frame has a water outlet at a second side thereof connecting to the first and second valves through the linking pipe, wherein a flow direction at the water outlet is the same as that in first inlet pipe.

11. The plastic body of claim 1 further comprising a disc having a first portion on a second side of the transverse frame and a second portion overhanging the transverse frame, wherein the sleeve has a cut matching the first portion of the disc, wherein the cut has an arcuate shape along a periphery of the first portion of the disc.

12. The plastic body of claim 11, wherein the transverse frame has a water outlet at the second side thereof communicating with the first and second valves through the linking pipe, wherein the disc surrounds the water outlet and the water outlet has a center eccentric with that of the disc.

13. A plastic body for a water channel comprising:
   a first valve;
   a second valve;
   a linking pipe between the first and second valves, wherein the linking pipe has a water outlet at a top surface thereof communicating with the first and second valves through the linking pipe, the linking pipe comprising a transverse frame and a plate covering an opening at a side of the transverse frame;
   a disc having a first portion on the top surface of the linking pipe and a second portion overhanging the top surface of the linking pipe, wherein the disc surrounds the water outlet and the water outlet has a center eccentric with that of the disc; and
   a sleeve surrounding the linking pipe;
   wherein the sleeve contacts the transverse frame and plate and covers an interface between the transverse frame and plate.

14. The plastic body of claim 13, wherein the opening receives the plate.

15. The plastic body of claim 13, wherein the transverse frame is fixed to a planar surface of the plate.

16. The plastic body of claim 13 further comprising a first inlet pipe connecting to the linking pipe via the first valve and a second inlet pipe connecting to the linking pipe via the second valve.

17. The plastic body of claim 16, wherein the first inlet pipe extends in parallel to the second inlet pipe.

18. The plastic body of claim 16, wherein a flow direction in the first inlet pipe is the same as that in the second inlet pipe, and a flow direction at the water outlet is the same as that in first inlet pipe.

* * * * *